United States Patent [19]

Glendinning

[11] 4,382,498
[45] May 10, 1983

[54] SILAGE HANDLING SYSTEM

[76] Inventor: Kenneth P. Glendinning, R.R. #2, Lucan, Ontario, Canada, N0M 2J0

[21] Appl. No.: 332,467

[22] Filed: Dec. 21, 1981

[51] Int. Cl.³ .............................................. B65G 11/16
[52] U.S. Cl. ..................................................... 193/34
[58] Field of Search .................. 193/2 A, 2 R, 29, 30, 193/33, 34; 414/299, 304; 239/688, 689; 141/331–345; 222/460–462, 566, 567, 526

[56] References Cited

U.S. PATENT DOCUMENTS 2,694,515 11/1954 Green .............................. 222/460 X
3,124,229 3/1964 Rutten ............................. 141/337 X Primary Examiner—Joseph E. Valenza
Assistant Examiner—Dennis Williamson

[57] ABSTRACT

The present invention relates to silage handling system for the discharge chute of an upright silo. It comprises a flange member secureable to the lower extremity of a silo discharge chute about the periphery thereof with this flange member restricting the size of the discharge opening. The flange member has a generally centered opening through which silage can pass and cooperates with a funnel member releasably secured to the flange member with the funnel member of a size to cover the opening in the flange. The flange is secured to the chute of a silo and the funnel member is releasably secured to the flange such that access to the interior of the chute through the opening in the flange is possible. In the preferred embodiment the flange and the funnel members are both made of a plastic material such that the flange can be modified to fit the individual characteristics of the silo and discharge chute to which it is to be installed. The funnel member is quite light, simplifying the removal and re-engagement of the funnel to the flange. This system provides an effective means for controlling the discharge of silage from the discharge chute of a silo in a manner which avoids leakage and minimizes waste of silage. The system is capable of operating under a variety of different conditions while still providing good access to the chute of the silo. The system is simple and rugged and easily modified in the field.

22 Claims, 6 Drawing Figures

SILAGE HANDLING SYSTEM

FIELD OF THE INVENTION

The present invention relates to silage handling systems and more particularly to a funnel arrangement for the discharge chute of an upright silo for storage of silage for livestock.

BACKGROUND OF THE INVENTION

Upright silos are commonly used to store silage for livestock. The silage is generally removed from the silo by an uloading system positioned at the top or bottom of the silo. This invention is for use with a silo having an unloader to remove the silage from the top of the silo and discharge it through the wall of the silo into the discharge chute.

Silos, which are unloaded from the top, generally have a vertical row of doors which extend from the bottom of the silo to the top. These doors close a passage from the inside of the silo to a vertical silo dishcharge chute on the outside of the silo wall. A silo unloader inside the silo removes silage from the top of the silage and conveys into the vertical silo discharge chute. The silage falls down the discharge chute and into a hopper for a conveyor system for distribution to livestock. As the silage is removed from the silo, it is necessary at various points in time for the operator to climb up the inside of the silo discharge chute to open the doors through which the silage is conveyed and to reposition the unloaders. At other times the unloader may require service, and access to the silo is obtained through the discharge chute.

U.S. Pat. No. 3,169,620, which issued to Patz, Feb. 16, 1965, disclosed a swingable silo spout which may be moved to the side to allow access to the interior of the silo discharge chute. Therefore, if the farmer must enter the chute to service the silo unloader or to open the next door of the discharge chute, the silo spout, which is positioned below the discharge chute, may be swung to one side allowing the farmer entry into the chute. As can be seen in the drawings of the reference, the spout is secured to the lower rungs of the silo ladder, thereby simplifying installation of the unit. This particular structure is made of sheet metal and it is not designed to provide a seal with the lower edge of the discharge chute. As such, there is a gap between the lower edge of the discharge chute 2 and the upper edge of the spout which will allow some of the discharged silage to escape. This is not desirable; however due to the different types of silo built and the different types of discharge chutes which can be secured to them, it has proven difficult to provide one structure which can universally be applied to all silos. Therefore, generally the prior art silo chute have compromised on the design features in order to provide a system which can be applied to most silos.

U.S. Pat. No. 3,699,732, which issued to Janssen et al., Oct. 24, 1972, discloses a collapsible liner for a silo chute which overcomes the leakage problem discussed in Patz's structure. According to this patent, a collapsible discharge chute liner is possible which keeps the discharge chute clean and relatively free of dust, such that the operator can climb up into the discharge chute and adjust either the liner or the unloader without being in direct contact with silage stuck in the chute. This collapsible liner keeps the discharge chute relatively clean; however, the farmer must climb up the discharge chute and reposition the funnel member 28 when the silage reaches a certain level.

U.S. Pat. No. 3,124,229, which issued to Rutten, Mar. 10, 1964, disclosed an adjustable hopper arrangement for the discharge chute of a silo, where the hopper is adjustable to more closely fit the size of the discharge chute to which the device is being secured. Again the hopper is pivoted to the silo chute and may be swung outwardly to allow access to the discharge chute. This device is made of a sheet metal material with a plurality of rivets or bolts securing it together. As can be seen in FIGS. 2, the hopper does not provide a seal with the base of the discharge chute and, therefore, some leakage of the unloaded silage may result. These patents only have one discharge position and height.

The present invention provides a simple, effective means for controlling the discharge of silage from the discharge chute of a silo in a manner which reduces leakage and minimizes waste of silage. The system is capable of operating under a variety of different conditions, as various types of silage will be used and the moisture content thereof can change substantially. The system reduces corrosion, while still providing access to the discharge chute of the silo. Convenience for the farmer is important and, therefore, the system is simple and rugged. Because of the varying type and construction of silos and the various different types of discharge chutes, the system is flexible so that it can function with the individual combinations of discharge chutes and silos found in the field. The system also allows the discharge of silage to be directed as it may be necessary to load the silage onto a conveyor or merely to load directly into a feed cart. Individual users may use both methods. The present invention provides a simple system with improved operating characteristics over those of the prior art.

SUMMARY OF THE INVENTION

A silage handling system for the discharge chute of a silo, according to the present invention, comprises a flange and a funnel, the flange is securable to the lower extremity of the silo chute and abut with the exterior wall of the silo. The flange has a central opening through which silage can pass, and the funnel is sized to cover the opening in the flange. The funnel is releasably secured to the flange whereby the funnel may be removed to allow access to the interior of the chute through the opening in the flange.

A silage handling system for the discharge chute of a silo, according to the present invention, directs silage unloaded from the silo and comprises a flange sized to restrict the bottom of the discharge chute and abut with the exterior wall of the silo. This flange has an opening generally centered beneath the access of the chute and cooperates with a funnel sized to conver the opening in the flange and releasably secured to the flange. The funnel arrangement may be released from the flange to allow access to the interior of the chute through the opening in the flange.

According to a preferred aspect of the invention, the funnel arrangement is made of a plastic material and preferably of a fiberglass reinforced plastic.

According to a further aspect of the invention, the silage handling system includes a flange having a frustoconical neck projecting downwardly and inwardly from the flange which cooperates with the funnel to mate with a portion of the funnel sidewall to provide a mechanical seal along the exterior surface of the neck. The funnel includes an outer circular rim about the top for abutting with the flange and allowing securement thereto.

According to yet a further aspect of the invention, the funnel member has an angled discharge orientated between 20 and 40 degrees relative to the vertical access of the funnel.

The silage handling system, according to the present invention, is for securement to the discharge chute of a silo and comprises a flange member securable to the lower periphery of the chute to restrict the opening thereof with the flange member including a generally centered opening through which silage can pass. The flange cooperates with a funnel member which is sized to cover the opening in the flange and direct the discharge of the silage. This arrangement further includes means for releasably securing the funnel to the flange, whereby the funnel is removable to provide access to the discharge chute.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
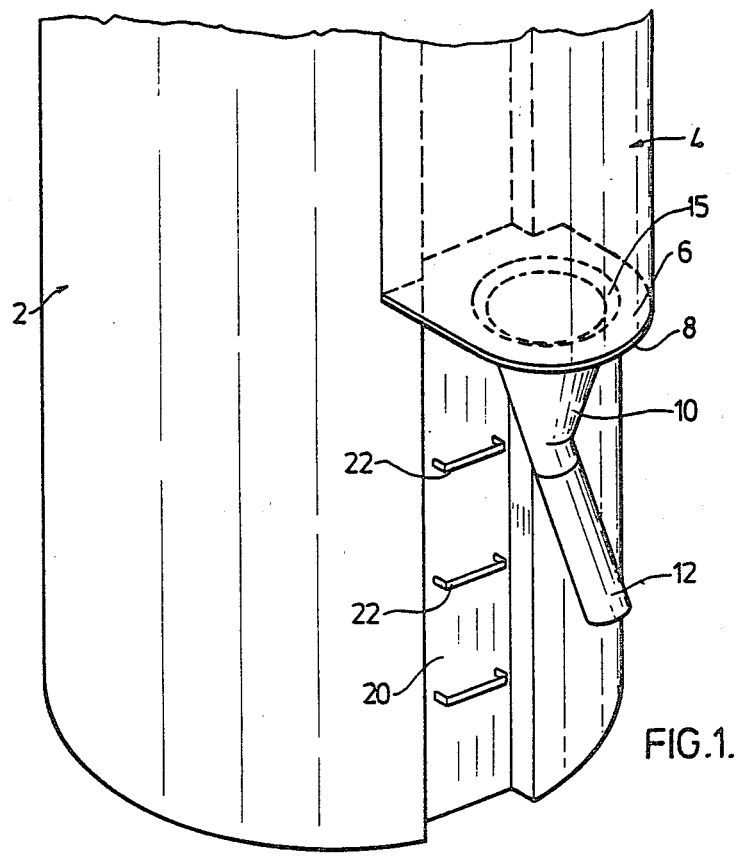
FIG. 1 is a perspective view of a portion of a silo and an associated discharge chute to which the silage handling system has have been suitably secured.

The silo 2, shown in FIG. 1, has a discharge chute 4 having a lower periphery 6 to which the flange 8 is secured about the periphery of the chute to restrict the size of the discharge opening. The flange has a generally centered opening which is covered by the funnel member 10, when brought into engagement with the flange. This funnel member further restricts the size of the discharge opening with silage passing through the funnel and eventually out the extension tube 12. The cooperating flange and funnel form the silage handling system.

Both the silo 2 and the discharge chute 4 can be made of various materials and the recessed portion for the steps 22 can change substantially from silo to silo. For this reason, it is important that the flange member be made of a material which allows simple modification on site to abut the exterior of the silo and cover the lower periphery of the discharge chute. By making the flange from a plastic material and perferably a fiberglass reinforced plastic, it is possible to cut the flange on site so that it abuts with the lower periphery of the discharge chute and also mates with the exterior wall of the silo. The flange effectively engages the silo and the lower periphery of the discharge chute, such that silage can pass through the centre opening. The flange is provided with a frusto-conical neck portion about the centre opening to facilitate alignment of the funnel 10 when brought into engagement with the flange. The inter cooperation of the funnel and this neck portion also allows the funnel to be rotated about the flange, such that the position of the silage is deposited from the extension pipe 12 can be varied. Preferably the mouth of the funnel has a diameter between 20 and 30 inches.

Figure 2:
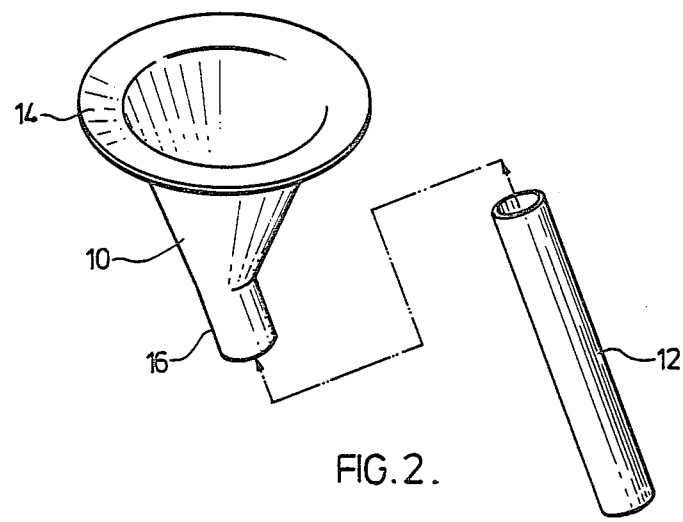
FIG. 2 is a perspective view of the funnel member and a pipe for extending the discharge thereof.
Figure 3:
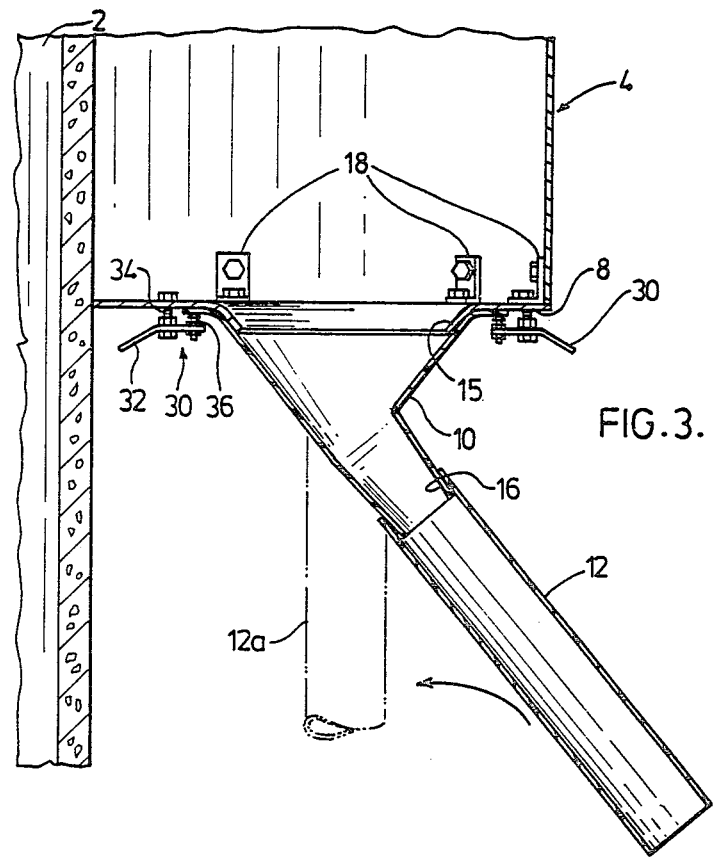
FIG. 3 is a cross-sectional view taken through the discharge chute of a silo illustrating one method of securing the flange to the bottom of the discharge chute and illustrating the method of securing the funnel to the flange.

As shown in FIG. 2, the funnel member has a rim portion 14 at the top thereof which abuts the planar portion of the flange member and will facilitate connection of the funnel to the flange. The opposite extreme of the funnel is end portion 16, which has a slight taper as shown in FIG. 3, to allow discharge pipe 12 to slide over the lower portion of the funnel and jam therewith. In this way the discharge of the funnel can be extended as necessary in a simple manner.

Figure 6:
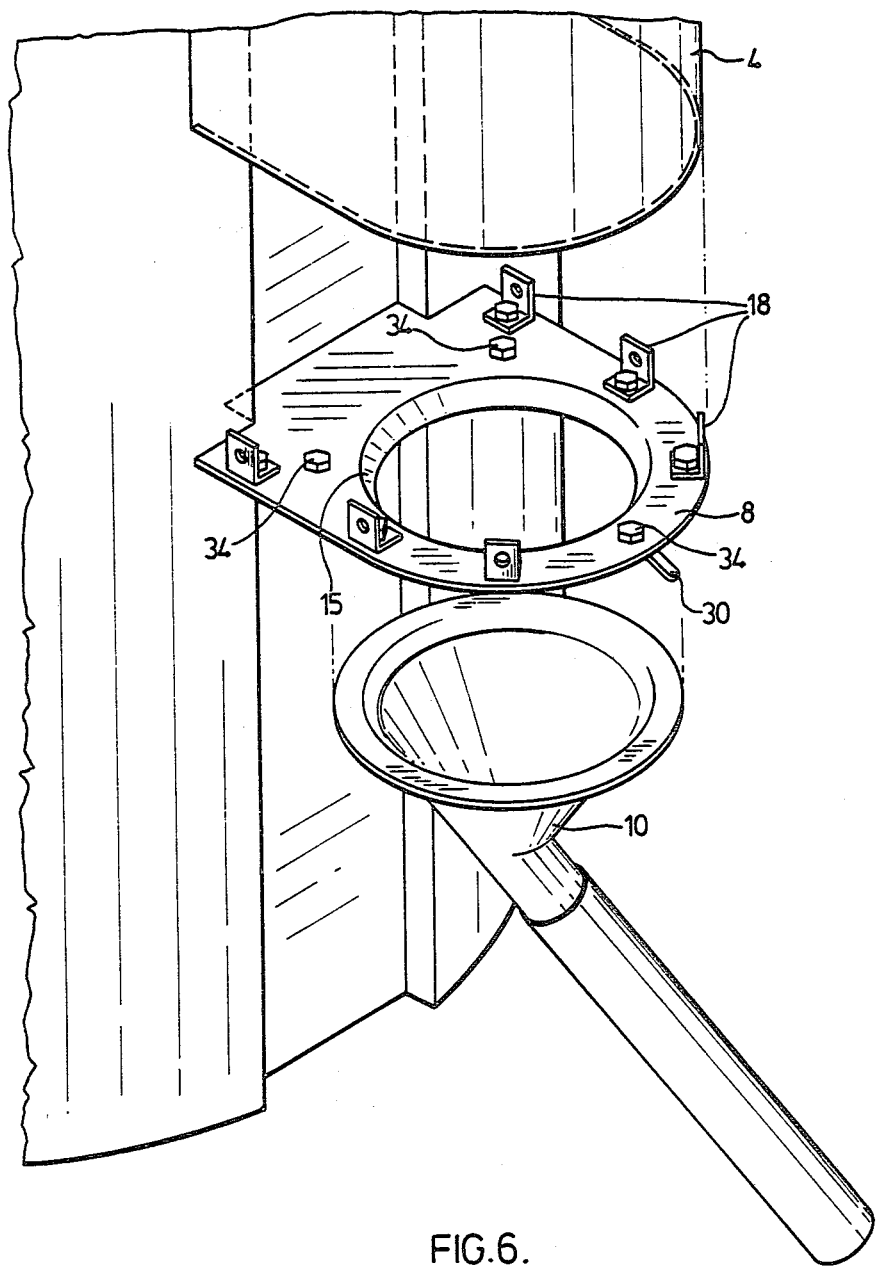
FIG. 6 is a perspective view illustrating the securement of the flange to the discharge chute of a silo.

Referring to FIGS. 3 and 6, details of the securement of the flange to a steel discharge chute is shown. The flange member 8 is secured to lower periphery of the discharge chute 4 by a plurality of bracket members 18 secured about the periphery of the flange. These L-shaped brackets, as shown, are positioned to contact the interior wall of the discharge chute 4 and secured by bolts. This is a simple securement method and provides flexibility for installation in the field. The rear portion of the flange member engages the silo wall and provides a fairly tight fit. As can be seen, a portion of the silo wall is recessed and the size of this recess often changes from silo to silo. For this reason the flange member 8 is manufactured such that it can be cut in the field to precisely fit with the silo. When the flange is made of a fiberglass or a plastic material, the cutting operation is easily done by the farmer. It is also preferred that the funnel member be made of a plastic material, as silage is quite corrosive thereby greatly reducing the life expectancy of metal structures.

The silo discharge chute may be made of other materials, such as concrete or wood, whereby the thickness of the chute is several inches. When this is the case the flange can be directly bolted into the lower periphery of the silo chute and the 'L' shaped brackets would not be required. Various methods of securing the flange to the silo chute are possible which will vary according to the preference of the installer and the silo discharge chute.

Bolts 34 are spaced about the periphery of the aperture of the flange member and provide support for the levers 30 used to secure the funnel to the flange. Each lever 30 has an aperture along its length for engagement with bolt 34, thereby positively supporting it beneath the flange with one end of the lever acting to positively engage the rim of the funnel and urge it into abutting contact with the flange with the opposite end of the lever acting as a handle. The lever is supported beneath the flange by the bolt and is positioned by two nuts either side of the lever. Washers separate the nuts from the lever. The end of the lever for engaging the rim of the funnel and urging it into abutting contact with the flange 8 has a bolt secured at one end, which is positionable relative to the lever. The bolt preferably has a round head which acts as a camming surface, simplifying the movement of the handle from a clear position, allowing the funnel to be removed from the flange, to the engage position with the bolt positively urging the funnel into abutting contact with the flange. There are a great number of different alternatives for releasably securing the funnel to the flange; however, this particular lever system is very simple and allows rapid adjustment in the field. Furthermore, it is very rugged and inexpensive and has proved satisfactory in use. It should be remembered that silage can be very fine particles and is corrosive, therefore, the method of securing the funnel to the flange should be simple.

Figure 4:
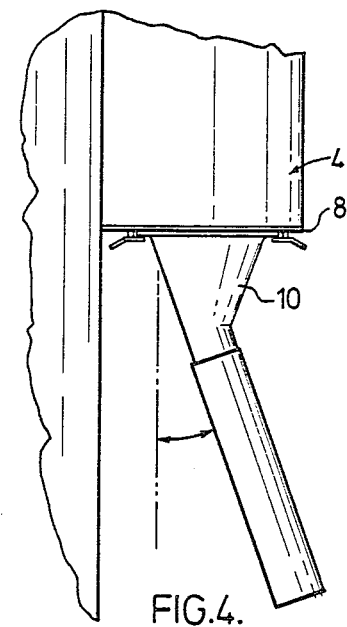
FIG. 4 is a side view illustrating a funnel member having a 20 degree discharge.
Figure 5:
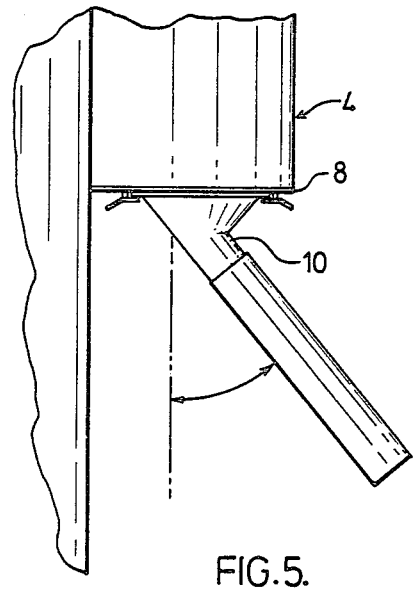
FIG. 5 is a side view illustrating a funnel member having a 40 degree discharge.

FIGS. 4 and 5 illustrate two discharge angles that have been found preferred with this particular silage handling system. In FIG. 4 the discharge angle of approximately 20 degrees from the vertical is shown, whereas in FIGS. 5, this discharge angle is approximately 40 degrees. The height between the lower periphery of the discharge chute and the bottom of the silo is often restricted and, therefore, if one is trying to load the silage into a conveyor several feet away, the greater discharge angle may be more useful. However in other circumstances, the 20 degree angle is quite sufficient. It is felt that the smooth interior surface of the fiberglass funnel enhances the discharge characteristics of the funnel. However, if a discharge angle substantially greater than 40 degrees is used, plugging of the funnel may result. With the present system, the discharge of the silo chute has been reduced to a pipe diameter of approximately nine inches which can easily be directed for loading silage onto a feed cart or into the bed of a conveyor. This provides good control, and reduces the amount of silage wasted.

The frusto-conical neck portion of the flange is preferred as it provides a mechanical seal between the abutting surfaces of the funnel on the frusto-conical neck portion as well as the abutting surfaces of the rim 14 and the flange 8. Sealing could be accomplished in other ways. For example, a neoprene type seal could be secured to the flange with the rim of the funnel coming into abutting contact with this seal which is maintained by the pressure of the handles forcing the rim into contact with the flange. The frusto-conical neck portion provided on the flange simplifies alignment of the funnel to the flange and also allows the funnel to be easily rotated about the flange without misaligning of the funnel and flange.

The two-component system of the present invention is quite compact beneath the lower extreme of the silo chute and thus facilitates greater control on the discharge of silage. Furthermore, by being made of a plastic material and preferably fiberglass reinforced plastic, it is lightweight and can easily be secured by the farmer. The structure is durable, adjustable, non-corrosive and very simple.

After silage has been loaded into a silo, there is a critical period where it may give off a dangerous gas. In this case, the lower discharge portion of the funnel may be plugged such that this gas does not leak into the feed room. Another advantage of this system is it is adaptable to the various types of discharge chutes and silos used in the field, such that one structure is essentially universal, with this structure greatly enhancing the sealing of the discharge chute thereby minimizing waste of silage. The silage handling system also reduces silo chute updrafts which may carry livestock moisture and undesirable feed "fines" from collecting on unloading equipment in the silo.

Although the invention has been described herein in detail, it will be understood by those skilled in the art that variations may be made thereto without departing from the spirit of the invention or the scope of the appended claims.

The embodiments of the invention in which an exclusive porperty or privilege is claimed are defined as follows:

1. In a silage unloading system having a discharge chute including an inlet means and a discharge, a silage hopper comprising a first member for securement to the discharge of such discharge chute and having an opening through which silage can pass, and a second member, defining a silage-converging through passage, releasably secured beneath said first member and cooperating therewith to converge silage passing through the opening in said first member, whereby silage unloaded into such discharge chute is controlled and directed by said first member and said second member to a point of discharge from said second member, removal of said second member allowing access to such discharge chute through the opening in said first member.

2. In a silage unloading system as claimed in claim 1, wherein the opening in said first member is of reduced size relative to the size of such discharge chute, said first member being adapted for securement with the opening generally centered below such chute.

3. In a silage unloading system as claimed in claim 1, wherein the opening in said first member restricts the effective size of the discharge of the discharge chute to the opening of said first member and said first member is positionable relative to such discharge chute such that said first member extends inwardly of the discharge about the periphery thereof.

4. In a silage unloading system as claimed in claim 1, 2 or 3, wherein said second member is funnel-shaped and with an outwardly extending rim portion at the top thereof for engagement with said first member about the opening, said first member including a downwardly extending frustoconical neck about the opening to facilitate positioning of said second member for securement to said first member.

5. In a silage unloading system as claimed in claim 1, or 3, wherein said second member is funnel-shaped and with an outwardly extending rim portion at the top thereof for engagement with said first member about the opening, said first member including a downwardly extending frustoconical neck about the opening to facilitate positioning of said second member for securement to said first member, said first and second members being made of a moldable material selected from the group consisting of plastic and fiberglass.

6. In a silage unloading system having a vertical discharge chute with a lower portion defining an opening for the discharge of silage, a silage directing arrangement comprising a flange sized to restrict the opening of such discharge chute, said flange having an opening therein through which silage can pass, a funnel sized to cover the opening in said flange, means for releasably securing said funnel to said flange and means for securing said flange to the lower portion of the such discharge chute whereby said funnel may be released from said flange to allow access to said chute through the opening in said flange, said flange, said funnel and said discharge chute when said flange and funel are secured, defining a passageway for receiving silage loaded into said discharge chute and discharging such silage at the point of discharge of said funnel.

7. In a silage unloading system as claimed in claim 6 wherein said flange and funnel are made of reinforced fiberglass plastic.

8. In a silage unloading system as claimed in claim 7 wherein said flange includes a frustoconical neck projecting downwardly and inwardly from said flange, said funnel cooperating with said neck and flange to provide a mechanical seal therebetween, said funnel including an angled discharge portion relative to the axis of said funnel, said funnel being rotatable about said neck.

9. In a silage unloading system as claimed in claim 6 wherein said funnel has an angled discharge orientated at an angle less than about 40 degrees relative to the vertical axis of the funnel, said funnel being positionable beneath said flange at a number of positions to vary the discharge direction of said funnel.

10. In a silage unloading system as claimed in claim 6 wherein the opening of said flange is circular and has a diameter within the range of about 20 to 30 inches.

11. In a silage unloading system as claimed in claim 6 wherein said funnel includes a rim at the top thereof for engaging said flange, said means for releasably securing said funnel to said flange includes pivoting levers secured about the periphery of the opening in said flange, each of said levers having a pivot along its length with one end of said lever including means for engaging the rim of said funnel and maintain the same in abutting contact with said flange, the opposite end of said lever forming a handle to move said means for engaging said rim into a locking or clear position by moving said lever about the pivot point.

12. In a silage unloading system as claimed in claim 11 wherein said engaging means includes a bolt having a rounded head secured to said lever such that the rounded head contacts said rim of said funnel to cam the funnel in contact with said flange.

13. A silage directing arrangement comprising in combination a silo discharge chute having a silage discharging bottom, a flange member for securement to and generally sealing with the bottom of said discharge chute, said flange member having an opening to be generally centered beneath the axis of said chute, and a funnel member sized to cover the opening in said flange, and means for releasably securing said funnel to said flange whereby said funnel member may be released from said flange member to allow a man access to said chute through the opening in said flange member, the combination cooperating to direct silage feed to said discharge chute to a point of discharge of said funnel.

14. A silage directing arrangement as claimed in claim 13 wherein said flange member including a frustoconical neck projecting downwardly and inwardly from said flange member, said funnel member being adapted to mate with said neck and generally seal therewith and wherein said funnel member has an angled discharge orientated between about 20 degrees and 40 degrees relative to the axis of the funnel member, said funnel being movable about said frustoconical neck to change the direction of the point of discharge of said funnel.

15. A silage directing arrangement as claimed in claim 1 or 2 wherein the opening of said flange member is of a diameter within the range of about 20 to 30 inches.

16. A hopper for securement to the discharge chute of a silo comprising a flange, a funnel and means for releasably securing said flange and said funnel, said flange having an opening therein for the passage of silage and a selectively severable oversized area about the opening to be cut to fit the discharge chute to which it will be assembled, said oversized area providing a contact surface for cooperating with the lower periphery of such discharge chute to restrict such discharge chute to the opening in said flange, said funnel being sized to cover the opening in the flange; said flange and said funnel when secured defining a passageway for receiving, converging and directing silage to a point of discharge of said funnel.

17. A hopper as claimed in claim 16 wherein said flange is made of a plastic material to facilitate cutting of at least a portion of said oversized area.

18. A hopper as claimed in claim 16 wherein said oversized area is generally planar and the opening in said flange is about 20 inches in diameter or greater.

19. A hopper for securement to the discharge chute of a silo comprising a flange, a funnel and means for releasably securing said flange and said funnel, said flange having an opening therein for the passage of silage and an area about the opening for providing a contact surface for cooperating with the lower periphery of a discharge chute to restrict discharge from such discharge chute to the opening in said flange, said funnel being sized to cover the opening in the flange; said flange and said funnel when secured defining a passageway for receiving, converging and directing silage to a point of discharge of said funnel, wherein said funnel includes an angled discharge relative to the axis of the funnel, said funnel being securable at various positions about the opening in said flange to thereby allow the location of the discharge of said funnel relative to the flange to be changed.

20. A hopper as claimed in claim 19 wherein said flange includes a downwardly extending frustoconical neck portion about the opening in said flange for mating with the upper portion of the interior surface of said funnel, said upper portion being frustoconical thereby allowing rotation of said funnel about said neck to alter the direction of discharge of said funnel relative to said flange.

21. A hopper as claimed in claim 19 wherein said funnel includes an upper rim, a generally frustoconical body portion extending downwardly from said rim and a discharge tube angled from the axis of said body portion to form a discharge direction 20 to 40 degrees from the discharge of said body portion and the opening in said flange is at least about 20 inches in diameter.

22. A hopper as claimed in claim 21 wherein said releasable securing means includes pivoting levers secured about the periphery of the opening in said flange, each of said levers having a pivot point along its length with one end of said lever including means for engaging the rim of said funnel and maintain the same in abutting contact with said flange, the opposite end of said lever forming a handle to move said means for engaging said rim into a locking or clear position by moving said lever about the pivot point.

* * * * *